Patented Aug. 7, 1934

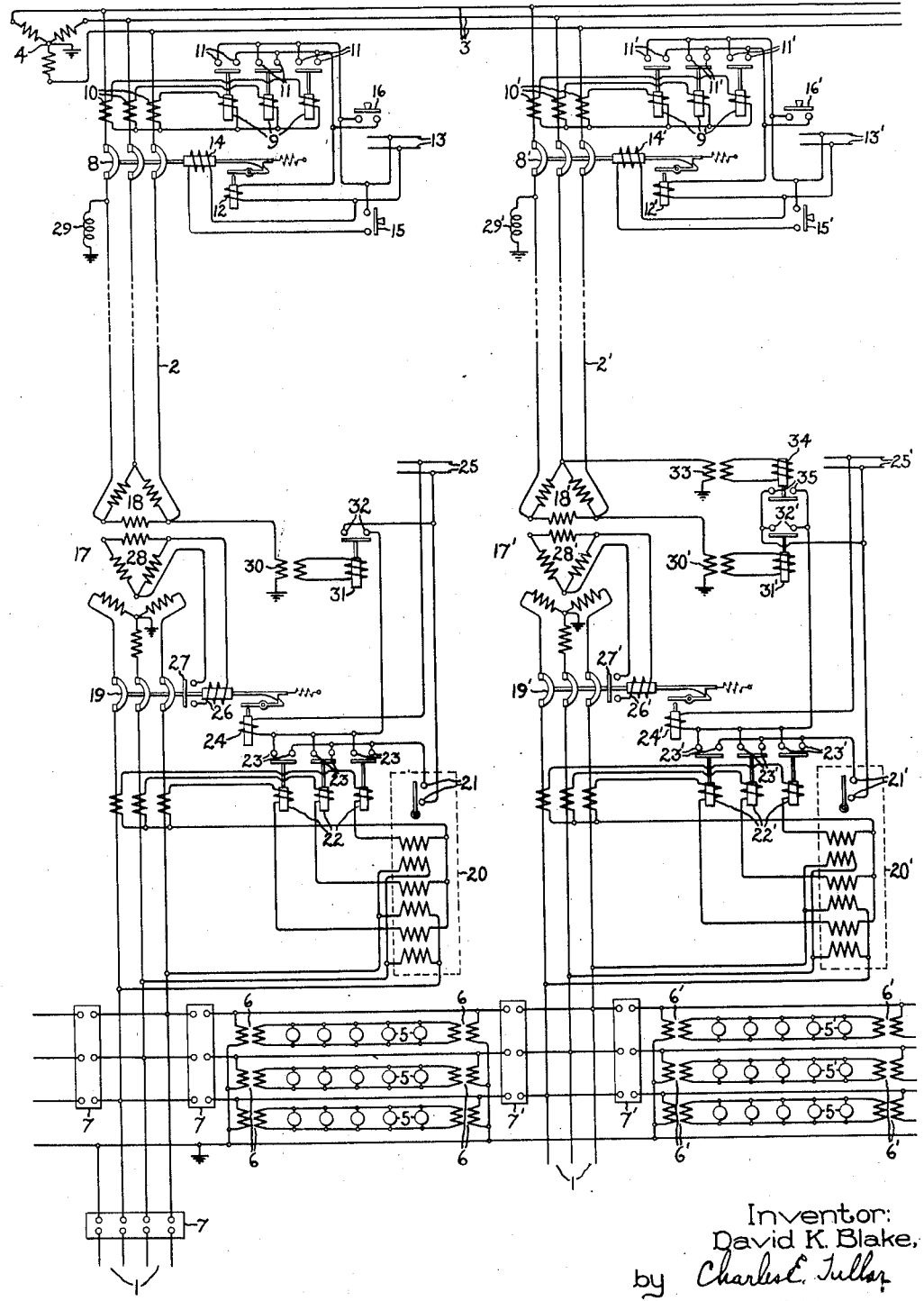

1,969,543

UNITED STATES PATENT OFFICE 1,969,543

ELECTRICAL DISTRIBUTION SYSTEM

David K. Blake, Scotia, N. Y., assignor to General Electric Company, a corporation of New York Application August 16, 1932, Serial No. 628,992
Renewed January 20, 1934

9 Claims. (Cl. 171—97)

My invention relates to electrical distribution systems, and more particularly to the control and protection of network-type distribution systems.

A network-type distribution system usually consists essentially of a network of interconnected distribution circuits which is supplied with energy by a plurality of feeder circuits connected to the network at spaced intervals. The source ends of the feeder circuits are usually relatively closely associated with each other in one or more substations, or central station, groups. It is often desirable to isolate individual feeder circuits from such systems and due to the relatively greater closeness of the source ends of the feeder circuits to each other than the network ends of these circuits, it is often desirable to provide means for enabling the disconnection of the network ends of the feeder circuits to be controlled from the source ends of these circuits.

In accordance with my invention I provide extremely simple means for controlling, from their source ends, the disconnection of network feeder circuits from the network at their network ends.

An object of my invention is to provide a new and improved electrical distribution system.

Another object of my invention is to provide novel and simple means for remotely controlling the circuit connections of an electric circuit.

A further object of my invention is to provide novel and simple control and protective means for network-type electrical distribution systems.

My invention will be better understood from the following description taken in connection with the accompanying drawing and its scope will be pointed out in the appended claims.

Referring now to the single figure of the accompanying drawing, I have shown my invention as applied to a polyphase network-type distribution system comprising essentially a network 1 which is energized by feeder circuits 2 and 2' which are connected to a bus 3 which in turn is energized by a solidly grounded neutral star connected source of current supply 4. Source 4 may either be the secondary winding of a power transformer or it may be the armature winding of an alternating current generator. I have illustrated my invention in connection with a three-phase distribution system but it will be obvious, as the description of my invention proceeds, that my invention is not limited to any particular number of phases and that it may be applied to single phase systems as well as to polyphase systems of any desired number of phases. The grounding of the neutral of winding 4 provides an arrangement which acts to maintain the potential to ground of the conductors of feeder circuit 2 substantially equal. The importance of this will become clear from the description of the operation of my invention. Network 1 is illustrated as of the three-phase, four-wire type having the fourth wire a ground wire carried through the network. Connected between the conductors of the network and the ground conductor are a plurality of loads 5, which are preferably connected to the network through distribution transformers 6. The network is also preferably provided with circuit breakers 7, which are symbolically shown, as they form no part of the present invention.

Feeder circuits 2 and 2' are provided with substantially identical control and protective systems and consequently corresponding elements of these equipments will be designated by corresponding primed reference numerals and only the equipment for circuit 2 will be described in detail. For controlling the connection of feeder circuit 2 to the supply bus 3 there is provided a circuit breaker 8 which has associated therewith the usual overload, or overcurrent, tripping means consisting of three overcurrent relays 9, connected in feeder circuit 2 by means of current transformers 10, and having their contacts 11 connected in parallel in a circuit including a tripping coil 12 for circuit breaker 8 and a suitable source of control current such as a control bus 13. The closure of circuit breaker 8 is controlled by a reclosing coil 14 which is connected across the control circuit 13 through a manual control switch 15. Any suitable manual control means, such as a switch 16 connected in parallel with the contacts 11 is provided for manually controlling the tripping of circuit breaker 8.

Connected in feeder circuit 2 is a step-down transformer 17 provided with a mesh, or delta, connected primary winding 18. The secondary winding of transformer 17 is connected to the network 1 by means of a circuit breaker 19. The usual protective equipment for controlling the tripping of circuit breaker 19 upon the occurrence of faults on the network 2 consists of a well known overload reverse power equipment consisting of a reverse power relay 20 which is arranged and connected to close a pair of contacts 21 upon the occurrence of a reverse power flow from the network through the circuit 2 into a fault, such as a short circuit or ground upon the circuit. This relay consists essentially of a polyphase contact making wattmeter. To insure that the circuit breaker 19 will not be tripped upon the occurrence of very small amounts of reverse power, such as the power supplied in magnetizing transformer 17, overload means in the form of overload relays 22 is provided. Relays 22 have their contacts 23 connected in parallel with each other and in series with the contacts 21, the circuit including these contacts including a tripping coil 24 for circuit breaker 19 and a suitable source of control current, such as a control bus 25. Reclosure of circuit breaker 19 may be obtained in any manner, and as shown a reclosing coil 26 is controlled automatically through back contacts 27 on the breaker. The circuit for the reclosing means may be energized from any suitable source, such for example as by a tertiary delta winding 28 on transformer 17. With such an arrangement breaker 19 will be automatically reclosed upon the reclosure of breaker 8.

For controlling the tripping of circuit breaker 19 from the source end of feeder circuit 2, I provide an arrangement consisting of a pair of relatively high impedance devices 29 and 30 connected respectively between different conductors of circuit 2 and ground. Connected to be responsive to the voltage across impedance 30 is an electroresponsive device 31 in the form of a voltage responsive relay having contacts 32 which are connected in parallel with the contacts 21 and 23. Thus when contacts 32 are closed the tripping coil 24 of circuit breaker 19 is energized and circuit breaker 19 will be tripped open. Impedance device 30, which is shown connected to one of the vertices or terminals of delta winding 18, may take any one of a number of equivalent forms, and as shown it consists of a two-winding potential transformer. However, it will be obvious to those skilled in the art that any simple straight impedance may be employed and the relay electroresponsive device 31 connected thereacross, or 30 may be an autotransformer, without departing from my invention in its broader aspects. Impedance devices 29 and 30 are preferably, although not necessarily, unequal and it is also preferable to have the impedance value of impedance 30 considerably higher than the impedance value of impedance 29.

The operation of my invention is as follows: With the elements in the positions illustrated in the drawing and with source 4 energizing the various circuits at normal potential, the potential across impedance 30 will be substantially the leg, or line to ground, voltage of source 4. Impedance devices 29 and 30 are of such high values that the quality of the potential to ground of all three conductors of circuit 2 is substantially unaffected. Assume now that circuit breaker 8 is tripped open, as for example, by the manual operation of switch 16. As soon as this operation takes place transformer 17 will be energized from the network which, it will be remembered, is energized from a plurality of additional feeder circuits, such for example, as the feeder circuit 2'. Consequently, the delta primary winding of transformer 17 will have substantially normal voltage between its terminals and a series circuit will be formed including one of the phase windings of the primary winding 18 and the two impedance devices 29 and 30. The potential across these impedance devices will divide directly as their relative reactance values so that the potential across impedance device 30 may be made substantially any value desired by properly choosing the relative ratio of the reactances 29 and 30. For example, assume that the impedance of device 30 is four times the impedance of device 29. Under normal conditions, that is to say, with circuit breaker 8 closed, the potential across device 30 will be the line to ground voltage of the circuit 2 which is substantially 58% of the line to line voltage of the circuit. However when circuit breaker 8 is open the line voltage which is applied to the series circuit including impedance devices 29 and 30 will divide across these devices in the ratio of their impedances and consequently the voltage across device 30 will be substantially four-fifths or 80% of the line voltage. Thus it will be seen that when breaker 8 goes from its closed position to its open position the voltage across device 30 goes from 58% to 80% and electroresponsive device 31 may be made to operate upon this marginal voltage difference thereby to trip open circuit breaker 19. It should be understood that the above example is merely illustrative of my invention and that a wide range of ratios of impedance values for devices 29 and 30 may be chosen, and for example, the ratios may be so chosen as to cause an actual decrease in voltage across device 30 when circuit breaker 8 is tripped and device 31 may be made undervoltage responsive instead of over-voltage responsive.

Associated with feeder 2' I show an additional impedance device 33, connected to control an electroresponsive device 34, having contacts 35 connected in parallel with contacts 32'. The purpose of this is to insure tripping of circuit breaker 19' on the occurrence of ground faults on circuit 2'. Thus, for example, if any one of the conductors of circuit 2' is grounded, full line to line potential will be applied across at least one of the impedances 30' or 33 and consequently circuit breaker 19' will be tripped. However, in circuit 2, if the conductor of this circuit which has impedance device 30 connected to it, is grounded, no voltage will be applied across impedance 30 and if relay 31 is operative on overvoltage the arrangement will not operate, as the ground fault responsive means will not cause the tripping circuit breaker 19 upon such a ground fault. However, if either of the other two conductors of circuit 2 is grounded full line to line potential will be applied across impedance 30 and relay 19 will automatically trip.

While I have shown and described particular embodiments of my invention, it will be obvious to those skilled in the art that changes and modifications may be made without departing from my invention in its broader aspects and I therefore aim in the appended claims to cover all such changes and modifications as fall within the true spirit and scope of my invention.

What I claim as new and desire to secure by Letters Patent of the United States, is:

1. In combination, a winding, means for maintaining the magnitude of the potential to ground of the terminal of said winding substantially equal, relatively high impedances connected between ground and two of the terminals of said winding respectively, and electroresponsive means connected to be responsive to the voltage across one of said impedances.

2. In combination, a polyphase mesh connected winding, means for normally maintaining the magnitude of the potential to ground of the vertices of said winding substantially the same, relatively high impedances connected between ground and two of the vertices of said winding respectively, and electroresponsive control means connected to be responsive to the voltage across one of said impedances.

3. In combination, a pair of windings, conductors connecting the terminals of said windings together, separate impedances connected between two of said conductors and ground, means for energizing each of said windings, means for grounding the neutral of one of said windings, the other winding having an isolated neutral, switching means for controlling the connections between said windings, and an electroresponsive device connected to be responsive to the voltage of one of said impedances.

4. In combination, a polyphase mesh connected winding, a grounded neutral star connected winding of the same number of phases as said mesh connected winding, means for selectively connecting said windings together whereby said star connected winding tends to equalize the potential to ground of the vertices of said mesh connected winding, a pair of unequal relatively high impedances connected respectively between two of the vertices of said mesh connected windings and ground, and an electroresponsive control device connected to be responsive to the voltage of one of said impedances.

5. In combination, a pair of windings, conductors connecting the terminals of different windings together, a pair of relatively high unequal impedances connected respectively between said conductors and ground, one of said windings having a grounded neutral and the other winding having an isolated neutral, means for energizing said grounded neutral winding, switching means for controlling the application of voltage to said isolated neutral winding from said grounded neutral winding, a load having a counter voltage coupled to said isolated neutral winding, switching means for controlling connection of said load to said isolated neutral winding, and means responsive to a predetermined maximum voltage across the higher of said impedances for causing said last mentioned switching means to disconnect said load.

6. In combination, a polyphase circuit, a grounded neutral star connected source of current supply, a switch for connecting said source to said circuit, a load having a counter voltage, a transformer with a mesh connected winding which is connected to said circuit, a switch for connecting said transformer to said load, relatively high impedances connected between two of the conductors of said circuit and ground, and means responsive to the voltage across one of said impedances for opening the switch which connects said load to said transformer.

7. In combination, a polyphase transformer having a secondary winding and a mesh connected primary winding, a load having a counter voltage, a circuit breaker for connecting the secondary winding of said transformer to said load, a solidly grounded neutral star connected polyphase source of current supply, a circuit breaker for selectively connecting said primary winding to said source, a pair of unequal relatively high impedances connected respectively between two of the vertices of said mesh connected primary winding and ground, and means responsive to the voltage across one of said impedances for controlling the tripping of the circuit breaker which connects said load to said transformer.

8. In combination, a distribution network, a feeder circuit therefor, a solidly grounded neutral Y connected source of current supply, a circuit breaker for connecting said source to said circuit, a step-down transformer in said circuit, said transformer having a delta connected primary winding, a circuit breaker for connecting the secondary winding of said transformer to said network, a relatively high impedance connected between one of the conductors of said circuit and ground, a higher impedance connected between another of the conductors of said circuit and ground, and means responsive to the voltage across said last mentioned impedance for tripping open the circuit breaker which connects the secondary winding of said transformer to said network when the voltage across said impedance reaches a predetermined high value.

9. In combination, a distribution network, a feeder circuit therefor, a solidly grounded Y connected source of current supply, a circuit breaker for connecting said source to said circuit, a step-down transformer connected in said circuit, said transformer having a delta connected primary winding, a circuit breaker connecting the secondary winding of said transformer to said network, a relatively high impedance connected between one of the conductors of said circuit and ground, a pair of substantially equal impedances which are substantially higher in value than said first mentioned impedance connected between the two remaining conductors of said circuit and ground respectively adjacent the vertices of the delta primary winding of said transformer, and means responsive to the voltages across said last mentioned impedances for tripping the circuit breaker which connects the secondary winding of said transformer to the network.

DAVID K. BLAKE.